Figure 1:
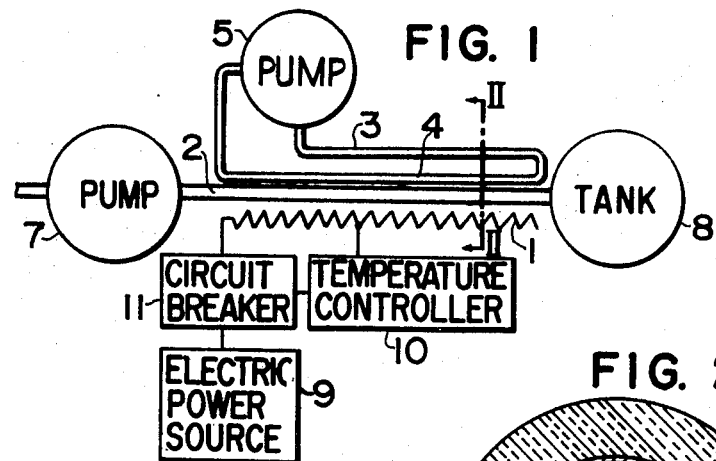

United States Patent
Ando et al.

[15] 3,678,243
[45] July 18, 1972

[54] METHOD FOR LEVELLING THE TEMPERATURE OF AN ELECTRICALLY HEATED PIPELINE

[72] Inventors: Masao Ando, Yoiohamashi; Masao Hori, Toyko, both of Japan

[73] Assignee: Chisso Corporation, Osaka, Japan

[22] Filed: Dec. 16, 1970

[21] Appl. No.: 98,713

[30] Foreign Application Priority Data

Dec. 27, 1969  Japan..........................45/1565
Nov. 18, 1970  Japan.........................45/101714

[52] U.S. Cl..............................219/301, 137/13, 137/341, 138/33, 165/107, 174/15 C, 219/300, 219/530
[51] Int. Cl..................H05b 1/00, F17d 1/18, F28d 15/00
[58] Field of Search.............219/300, 301, 280–283, 219/341, 530, 540, 535; 138/32, 33, 38; 239/13, 128, 135; 165/1, 2, 30, 104–108; 237/80; 137/1, 13, 59, 79, 301, 334, 339, 340, 341; 174/15 R, 15 C

[56] References Cited

UNITED STATES PATENTS

| | | | |
|---|---|---|---|
| 1,960,866 | 5/1934 | Chadwick | 137/340 |
| 1,016,958 | 2/1912 | Roberts et al. | 137/13 |
| 2,937,009 | 5/1960 | Anderson | 165/105 X |
| 3,170,026 | 2/1965 | Woodson | 137/340 X |
| 3,409,731 | 5/1968 | Fink et al. | 174/15 C |
| 3,548,158 | 12/1970 | McCaskill | 219/535 X |
| 2,286,594 | 6/1942 | Bennett | 174/15 C |
| 3,485,930 | 12/1969 | Priaroggia | 174/15 C |
| 3,423,570 | 1/1969 | Trabilcy | 219/301 |
| 3,377,463 | 4/1968 | Rolfes | 219/300 |
| 3,293,407 | 12/1966 | Ando | 219/301 |

*Primary Examiner*—Anthony Bartis
*Attorney*—Fred C. Philpitt

[57] ABSTRACT

A method for minimizing temperature gradients in a fluid being transported through an elongated electrically heated pipeline comprises the independent circulation of a heat transfer fluid through at least one tracing tube arranged either internally or externally along the length of the pipeline simultaneously with the application of electrical energy to the pipeline to heat the transported fluid. The heat transfer fluid has a high heat transfer coefficient. The quantity of heat transfer fluid circulated through the tracing tubes is small (about 1 percent in the case where both the transported fluid and the heat transfer fluid are liquids) in comparison to the amount of transported fluid passing through the pipeline on a volume per unit length basis. In one arrangement a single pump circulates the heat transfer fluid through serially connected tracing tubes arranged along the length of the pipeline. In another arrangement, the heat transfer fluid is reciprocated alternately through a single tube extending longitudinally of the pipeline by pumps and associated holding tanks arranged at both ends of the tube.

4 Claims, 5 Drawing Figures

PATENTED JUL 18 1972  3,678,243

METHOD FOR LEVELLING THE TEMPERATURE OF AN ELECTRICALLY HEATED PIPELINE

DESCRIPTION OF THE INVENTION

The present invention relates to a method for minimizing a local change of temperature in a pipeline to be maintained at an elevated temperature.

When a liquid having a high viscosity at an ambient temperature or a liquid which solidifies at an ambient temperature is transported through a pipeline by reducing the viscosity or preventing solidification by heating, or when a gas which is to be maintained at an elevated temperature is transported through a pipeline, it is now common practice to heat and maintain the pipeline at an elevated temperature by electric heating. One of the advantages of temperature maintenance by heating with electricity over other heating methods, e.g. with tracing of steam or warm water pipes, is its easy control of temperature, i.e., accurate maintenance of heating temperature on account of its capability of levelling heat generated in the longitudinal direction of the pipeline. However, even if the generated heat could be maintained evenly, the temperature in the longitudinal direction of the pipeline cannot be levelled if the insulation is not uniform. In a pipeline, it is quite difficult to make the insulation uniform in the longitudinal direction, and it is not easy to control the heat loss variation (usually occurring locally within the range of length shorter than several meters of a pipeline) within the range of ±10 percent. Further, since the pipeline must be provided with stanchions or supports at necessary locations, the heat losses from these parts are naturally larger than those in other parts, which results in unevenness of temperature.

Such causes of unevenness of temperature do not bring about a problem when a fluid is being transported, due to the temperature-levelling effect of the fluid being transported, but the things that do bring about a problem are when the quantity of fluid to be transported is very small, or the transportation of fluid is stopped, or the pipeline is small in its diameter and long in its length.

The object of the present invention is to provide a method for minimizing temperature variations which occur in a pipeline being electrically heated.

Figure 2:
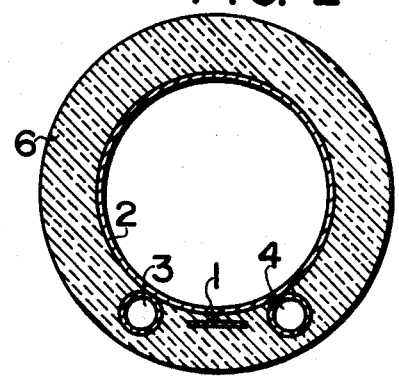
Figure 3:
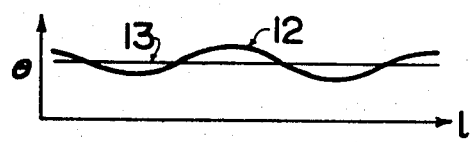
Figure 4:
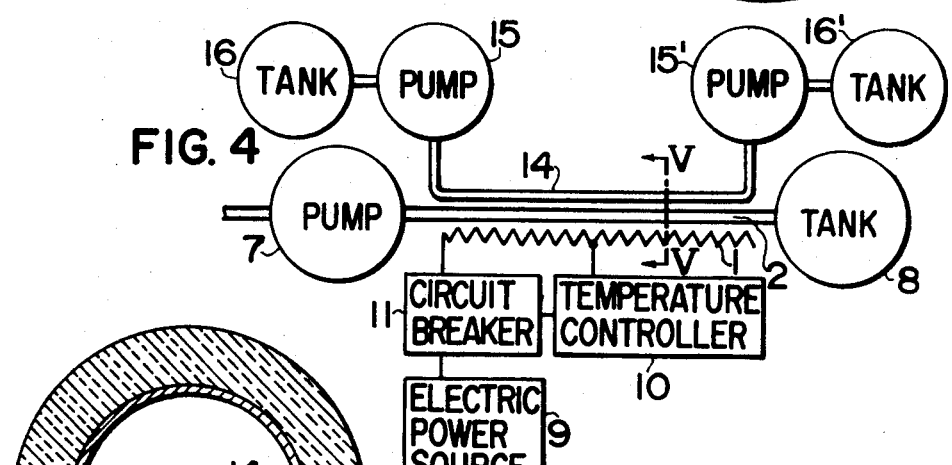
Figure 5:
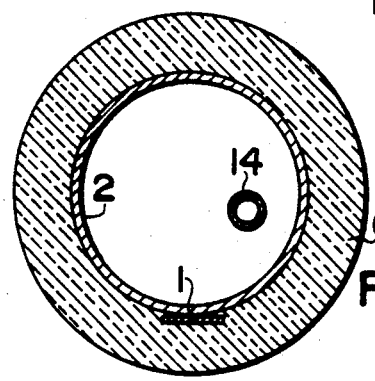

FIG. 1 shows a schematic diagram of a pipeline to be electrically heated to which one embodiment of the method of the present invention is applied. FIG. 2 shows an embodiment of a cross-sectional view along II — II line of FIG. 1. FIG. 3 shows characteristic curves of temperature in the longitudinal direction of a pipeline. FIG. 4 shows a schematic view of a pipeline to be electrically heated to which another embodiment of the method of the present invention is applied. FIG. 5 shows an embodiment of a cross-sectional view along V — V line of FIG. 4.

The present invention consists in a method for transporting a fluid through a pipeline having an electrical heating means along the length thereof while maintaining the fluid at an elevated temperature, which method comprises arranging along the pipeline, at least one tracing tube through which a fluid is passing, independently from the transportation of the fluid passing through the pipeline.

Among the fluids that may be transported at an elevated temperature, there may be mentioned heavy oil, crude oil, sulphur, phthalic acid anhydride, chlorine gas saturated with water vapor, etc.

As for the fluid to be passed through the above-mentioned tracing tube, a fluid having a large coefficient of heat transfer relative to the wall of the tube is preferred, and from this viewpoint, liquid is more desirable than gas. As such liquid, there may be mentioned water, a eutectic mixture of biphenyl and diphenylether having a proportion of 1:3 by weight, a eutectic mixture of biphenyl and naphthalene having a proportion of 85:15 by weight, O-dichlorobenzene, chlorinated diphenyl, chlorinated triphenyl, a mixture of chlorinated diphenyl and chlorinated triphenyl, etc.

According to one method for passing a fluid through the tracing tube, two or more tracing tubes are arranged along with a pipeline in the longitudinal direction and separated into two sets, one set being utilized as "going" tubes and the other set being utilized as "returning" tubes whereby the fluid is circulated through these tubes. As an alternative method, one tracing tube is arranged along with a pipeline in the longitudinal direction and furnished with pumps and tanks at both the ends of the tube, a fluid being reciprocated alternately through such a tube.

The above-mentioned electrical heating means include heat-generating pipes utilizing skin effect current as described in U.S. Pat. Nos. 3,293,407 and 3,515,837, butyl rubber-insulated vinyl-coated cables, mineral - insulated metal-coated cables, and further a means of heating by passing electric current directly through the above-mentioned fluid-transporting pipe.

Now, referring to the accompanying drawings, the present invention will be explained.

FIG. 1 shows a schematic diagram illustrating a method of the present invention wherein the above-mentioned tracing tubes are separated into two sets, one set consisting of tracing tubes through which a fluid is sent, while the other set consisting of those through which the fluid is returned, and the fluid is circulated through these tubes. In this figure, numeral 1 shows an electrically heat-generating body, and is usually arranged along a fluid-transporting pipe 2 so as to generate heat uniformly throughout the total length thereof, as seen in the Figure. Further, at such parts as stanchions, fixed supports, valves, etc., in the pipeline (not shown in the Figure), heat generation may be adjusted locally according to the heat losses occurring there. Numeral 9 shows an electric power source, and voltage and current are given according to the heat requirement of the heat-generating body 1. The control of the temperature of the pipeline is carried out by opening or closing a circuit breaker 11 through a temperature-controller 10 or by adjusting the voltage of the power source. Numeral 7 shows a pump for transporting the fluid, and 8 shows a tank for receiving the fluid being transported. Numerals 3 and 4 show tracing tubes. Numeral 5 shows a pump. FIG. 2 shows a cross-sectional view of one embodiment in which the tracing tubes as well as the electrically heat-generating body 1 are arranged along the fluid-transporting pipe 2. In this embodiment, tracing tubes 3 and 4 are positioned on the outside of the fluid-transporting pipe 2, but, of course, they can also be placed in the inside of the pipe. Numeral 6 shows a heat-insulating layer, and this is omitted in FIG. 1.

The fluid passing through the tracing tubes 3 and 4 supplies heat to the pipeline through the tubes 3 and 4 at a lower temperature part of the pipeline, while said fluid receives heat from the pipeline through the tubes located at a higher temperature part thereof. Further, the temperature can be levelled to the desired extent by increasing or reducing the quantity of fluid passing through the tracing tubes 3 and 4. Such a relationship is shown in FIG. 3. In this Figure, the ordinate shows the temperature ($\theta$) of a fluid in the transporting pipe, while the abscissa shows a distance (l) in the longitudinal direction of the pipeline. Curve 12 shows the temperature distribution of the fluid to be transported at the time when the fluid in the pipe 2 is stagnant without additional heating by the tracing tube of the pipe 2. In such a case, it is possible to level the temperature of the fluid in the pipe 2 as seen in line 13 by passing the fluid through the tracing tubes 3 and 4. For this purpose, the circulating fluid is so adjusted that a mean value of temperatures on curve 13 is almost equal to that on curve 12 except when the fluid starts to flow through the tracing tubes 3 and 4. Obviously, heating of the fluid at one place at a temperature of the fluid higher or lower than desired would cause an uneven temperature distribution. In other words, the circulating fluid is to a reasonable temperature before being pumped into the tracing tube. Thus, the circulating fluid functions as a heat medium in the tracing tube which can automatically be either a heat source or a heat absorber in accordance with a temperature level of the pipeline where the temperature is higher or lower.

FIG. 4 shows a schematic view of an embodiment wherein one set of tracing tubes is furnished with pumps and tanks at both the ends of the tracing tube and a fluid is reciprocated alternately through the tracing tube. In this Figure, numerals 1, 2, 7, 8, 9, 10 and 11 have the same meanings as in FIG. 1. Numeral 14 shows one tracing tube, which is shown to be on the outside of the pipe 2 for a better understanding, but may be positioned on the inside of the pipe 2, as shown in FIG. 5; 15 and 15' show pumps provided at both the ends of the tracing tube; and 16 and 16' show tanks for storing the fluid to be passed through the tracing tube. FIG. 5 shows a cross-sectional view of an embodiment of the present invention wherein a tracing tube as well as an electrical heat-generating body 1 are arranged along a fluid-transporting pipe 2. In this embodiment, the tracing tube is positioned in the inside of a fluid-transporting pipe 2, but, of course, it can be placed on the outside of the pipe. Numeral 6 in FIG. 5 shows a heat-insulating layer which is omitted in FIG. 4.

Now, provided that the fluid to be used for levelling the temperature is filled in the tank 16 at first, the fluid is sent through the tracing tube 14 by means of a pump 15 to a tank 16' which is empty at first. In this case, it is understood that the fluid passing through the tracing tube 14 is sent through a by-pass (not shown in the Figure) to the tank 16' without passing through the pump 15'. When the fluid in the tank 16 becomes almost depleted and the tank 16' is filled nearly up to its full capacity, the fluid direction is reversed and sent from the tank 16' to the tank 16 by utilizing the pump 15' instead of the pump 15. Thus, the fluid being reciprocated through the tracing tube 14, supplies heat to the pipeline at the lower temperature part, while it receives heat from the pipeline at the higher temperature part, to contribute to the levelling of the temperature of the pipeline. The relationship shown in FIG. 3 holds also in the method of FIG. 4. In the method of FIG. 4, too, the respective means values of temperature of curves 12 and 13 of FIG. 3 should be adjusted so as to be almost equal, except at the time that fluid is first started to be passed through the tracing tube 14. For this purpose, the tracing fluid is adjusted to meet the specific temperature as stated above in connection with FIG. 3, at the tank 16 or 16' or at some neighboring place.

The method shown in FIG. 1 necessitates at least two tracing tubes, whereas the method shown in FIG. 4 will need only one tracing tube. However, since the method shown in FIG. 4 necessitates additionally the pump 15' and the tank 16', such costs should be taken into account when comparing the relative economics of the embodiment shown in FIG. 4 and the embodiment shown in FIG. 1.

Next, some important points to be noted in the design of the present apparatus will be hereinafter described including the embodiments shown in FIGS. 1 and 4.

For example, if an unevenness of heat dissipation in the longitudinal direction of the pipeline corresponds to 10 kcal per meter of pipeline length per hour (i.e. 10 kcal/mhr) as compared with its mean value, and if the method of the present invention is not employed, the coefficient of heat transfer per meter of pipeline length between the transporting pipe 2 and the tracing tubes 3 and 4 or 14 should be 5 kcal/mhr or more in order to permit the unevenness of temperature to be within the range of $\pm 2°$ C. in accordance with the present invention. For this purpose, it is necessary that the tracing tubes 3 and 4 or 14 be welded to the transporting pipe 2, or the space between the tubes and the pipe be filled with a heat-conductive cement, or sometimes, the pipe 2 can be furnished with an outer sheath pipe to build up a dual structure.

If the fluids passing through the transporting pipe 2 and the tracing tube 14 are both liquids, about 1 percent of a usual quantity of the liquid to be transported through the transporting pipe 2 will be usually sufficient for the quantity to be passed through the tracing pipe 14 although the latter quantity varies according to unevenness of thermal insulation. Thus, according to the method of the present invention, it becomes possible without any high grade of insulation to transport a substance such as sulphur which liquefies at about 115° C. and is highly viscous at about 160° C. In addition, in transporting such a substance as sulphur at a high temperature, the use of a substance such as chlorinated diphenyl or the like which does not solidify at an ambient temperature and does not deteriorate even at a high temperature, is preferably for the fluid to be passed through the tracing tube.

What is claimed is:

1. An improved method for evening out the temperature of a fluid that is heated which is being transported through an elongated pipeline which comprises
   a. utilizing electrical energy to apply heat to the pipeline fluid as it moves through said pipeline,
   b. establishing at least one linear path along said pipeline for the flow of a heat transfer liquid, each said linear path being closely adjacent to, but out of direct contact with, said pipeline fluid, and
   c. passing a heat transfer liquid having a high heat transfer coefficient through each said linear path at the same time that electrical energy is being applied to heat the pipeline fluid, the quantity of said heat transfer liquid being passed through each said linear path being small in comparison to the amount of pipeline fluid passing through said pipeline on a volume per unit length basis,
   whereby said heat transfer liquid functions to even out the temperature gradients of the fluid being transported through the length of the pipeline.

2. A method according to claim 1 wherein at least one linear path is located inside said pipeline.

3. A method according to claim 1 wherein at least one linear path is located outside said pipeline.

4. A method according to claim 1 wherein the direction of said heat transfer fluid passing through each said linear path is periodically reversed.

* * * * *